United States Patent
Li et al.

(10) Patent No.: US 9,229,835 B2
(45) Date of Patent: Jan. 5, 2016

(54) METHOD AND APPARATUS FOR MONITORING STATE OF ONLINE APPLICATION

(71) Applicant: Baidu Online Network Technology (Beijing) Co., Ltd., Beijing (CN)

(72) Inventors: Yanhong Li, Beijing (CN); Jianting Zhu, Beijing (CN); Jinrong Wang, Beijing (CN); Jun Zhou, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/549,025

(22) Filed: Nov. 20, 2014

(65) Prior Publication Data

US 2015/0081248 A1    Mar. 19, 2015

Related U.S. Application Data

(60) Division of application No. 13/801,643, filed on Mar. 13, 2013, which is a continuation of application No. PCT/CN2011/079786, filed on Sep. 17, 2011.

(30) Foreign Application Priority Data

Sep. 17, 2010   (CN) .......................... 2010 1 0284610
Sep. 17, 2010   (CN) .......................... 2010 1 0284630

(51) Int. Cl.
　　*G06F 7/00*　　　(2006.01)
　　*G06F 17/30*　　 (2006.01)
　　*G06F 11/30*　　 (2006.01)

(52) U.S. Cl.
　　CPC ........ *G06F 11/302* (2013.01); *G06F 17/30864* (2013.01)

(58) Field of Classification Search
　　CPC .......................... G06F 17/30864; G06F 11/302
　　See application file for complete search history.

(56) References Cited

U.S. PATENT DOCUMENTS

| 7,653,567 B2 | 1/2010 | Gorham |
| 7,890,622 B2 | 2/2011 | Coca et al. |

(Continued)

FOREIGN PATENT DOCUMENTS

| CN | 101042695 A | 9/2007 |
| CN | 101059804 A | 10/2007 |

(Continued)

OTHER PUBLICATIONS

First Office Action from Chinese Application No. 201010284610.0, with English Translation, dated Jun. 29, 2011, 9 pages.

*Primary Examiner* — Azam Cheema
(74) *Attorney, Agent, or Firm* — Seed IP Law Group PLLC

(57) ABSTRACT

An online application system and a method for implementing an online application system are disclosed. A method for implementing the online application system includes a) receiving a user search request from a user browser; b) searching for a match according to the search request and obtaining an online application that matches with the search request to form a search result page; and c) presenting the online application before the user browser in a form as a canvas page which is embedded in the search result page and is directly accessible from the search result page. The present disclosure also provides an online application system. The technical solutions disclosed herein allow a user to directly search out an online application via a search engine without a need to click multi-level linkages, thereby providing a quick and convenient search process which enhances the users' experiences with networks.

18 Claims, 17 Drawing Sheets

(56) References Cited

U.S. PATENT DOCUMENTS

| | | |
|---|---|---|
| 8,065,286 B2 | 11/2011 | Jones |
| 8,250,082 B2 | 8/2012 | Gwozdz et al. |
| 8,341,239 B2 | 12/2012 | Hao et al. |
| 8,612,305 B2 | 12/2013 | Dominguez et al. |
| 2002/0083183 A1* | 6/2002 | Pujare et al. .................. 709/231 |
| 2002/0111967 A1 | 8/2002 | Nagase |
| 2003/0187680 A1 | 10/2003 | Fujino et al. |
| 2007/0226242 A1 | 9/2007 | Wang et al. |
| 2008/0127133 A1 | 5/2008 | Aghara et al. |
| 2008/0235566 A1 | 9/2008 | Carlson et al. |
| 2009/0070126 A1 | 3/2009 | MacDaniel et al. |
| 2010/0094856 A1* | 4/2010 | Rodrick et al. ............... 707/706 |
| 2010/0138761 A1 | 6/2010 | Barnes |
| 2012/0023487 A1* | 1/2012 | Letca et al. .................... 717/130 |
| 2012/0054167 A1 | 3/2012 | Chi et al. |

FOREIGN PATENT DOCUMENTS

| | | |
|---|---|---|
| CN | 101405734 A | 4/2009 |
| CN | 101558629 A | 10/2009 |
| CN | 101789935 A | 7/2010 |
| CN | 101662462 A | 1/2013 |

\* cited by examiner

METHOD AND APPARATUS FOR MONITORING STATE OF ONLINE APPLICATION

RELATED APPLICATIONS

The present application claims the priority of the Chinese patent application having Serial No. 201010284610.0, entitled "Online Application System and Method for Implementing the Same", filed on Sep. 17, 2010, and the priority of the Chinese patent application having Serial No. 201010284630.8, entitled "Method and Apparatus for Monitoring State of Online Application", filed on Sep. 17, 2010.

BACKGROUND

1. Technical Field

The present application relates to network technology, and particularly to an online application system and a method for implementing an online application system.

2. Description of the Related Art

In times of Web 2.0, a user demands much more from the Internet than simply acquiring desired information. The user wants to be more involved and have interactions with the Internet. An online application is one of the important ways for these interactions between the user and Internet. The online application refers to a browser-based Web application that provides network interacting capability. However, in view of the development of the existing online applications, the user needs to log in various websites that offer these online applications and click various links thereon to eventually obtain an online application program.

So far, a user has been allowed to search for an online application using a search engine. Disadvantageously, the user is only given a link to the corresponding online application, and needs to click that link to enter the Website offering that online application to gain access to the online application. Besides, even though the user may search out the desired online application via the search engine, he or she needs to conduct plenty of actions after clicking the link to enter the corresponding Website. For example, the user has to click multi-level links or advertisements to finally obtain the desired online application. Furthermore, there are chances that these links to the online applications are connected to certain malicious websites, leading to poor network security.

BRIEF SUMMARY

In view of the above, at least some embodiments provide a method for implementing an online application system, which allows a user to directly search out an online application via a search engine without a need to click multi-level linkages.

In an embodiment, a method for implementing an online application system comprises: a) receiving a user search request from a user browser; b) searching for a match according to the search request and obtaining an online application that matches with the search request to form a search result page; and c) presenting the online application before the user browser in a form as a canvas page which is embedded in the search result page and is directly accessible from the search result page.

According to an embodiment of the present disclosure, said presenting the online application before the user browser is executed in response to a user request or automatically.

According to an embodiment of the present disclosure, said presenting the online application before the user browser comprises: sending a canvas page code that corresponds to the online application to the user browser so as to form the canvas page.

According to an embodiment of the present disclosure, said presenting the online application before the user browser further comprises providing at least one of the online application and contents related to the online application from a third party application server.

According to an embodiment of the present disclosure, said presenting the online application before the user browser further comprises: sending the online application to the user browser to form an embedded page to be embedded in the canvas page.

According to an embodiment of the present disclosure, said presenting the online application before the user browser further comprises sending the contents related to the online application to the user browser.

According to an embodiment of the present disclosure, said presenting the online application before the user browser further comprises sending a request from the canvas page or the embedded page to the third party application server; and sending the contents related to the online application from the third party application server to the user browser.

According to an embodiment of the present disclosure, said presenting the online application before the user browser further comprises: sending an application request to a third party application server; receiving the online application from the third party application server; and processing the online application and sending the processed online application to the user browser to form an embedded page to be embedded in the canvas page.

According to an embodiment of the present disclosure, said presenting the online application before the user browser further comprises: sending a data request to the third party application server; receiving the contents related to the online application from the third party application server; and transmitting the contents to the user browser.

According to an embodiment of the present disclosure, said presenting the online application before the user browser further comprises: transmitting contents related to the online application to the third party application server; receiving the contents related to online application that have been processed by the third party application server; and transmitting the processed contents to the user browser.

According to an embodiment of the present disclosure, said presenting the online application before the user browser further comprises: sending an application request from the canvas page to a third party application server; and sending the online application from the third party application server to the user browser to form an embedded page to be embedded in the canvas page.

According to an embodiment of the present disclosure, said presenting the online application before the user browser further comprises: sending a data request from the canvas page or the embedded page to the third party application server; and sending contents related to the online application from the third party application server to the user browser.

According to an embodiment of the present disclosure, said presenting the online application before the user browser further comprises: sending a data request from the canvas page or the embedded page to the third party application server; transmitting contents related to the online application to the third party application server in response to receiving the data request forwarded from the third party application server; and sending the contents related to the online application from the third party application server to the user browser.

According to an embodiment of the present disclosure, the aforesaid method further comprises: S1) calculating how many times the user browser respectively loads a canvas page from the application platform server, and loads an embedded page from the third party application server; and S2) determining a running state of the online application that produces the embedded pages based on the times of loading the canvas page and the times of loading the embedded page.

According to an embodiment of the present disclosure, said receiving a user search request from a user browser further comprises: receiving a first request from the canvas page through the user browser; and determining the times of loading the canvas page as the times of receiving the first request.

According to an embodiment of the present disclosure, said receiving a user search request from a user browser further comprises: receiving a second request from the embedded page through the user browser; and determining the times of loading the embedded page as the times of receiving the second request.

According to an embodiment of the present disclosure, the second request is generated by an embedded program that is embedded in the online application.

According to an embodiment of the present disclosure, if the ratio of the times of loading the embedded page to the times of loading the canvas page is determined to be smaller than a threshold value at said Step b), the online application is determined to be running abnormally.

According to an embodiment of the present disclosure, the threshold value is a statistical threshold determined according to the calculated result.

According to an embodiment of the present disclosure, the threshold value is set to $0.85*X$, in which X denotes an average ratio of the times of loading the embedded page to the times of loading the canvas page which are calculated under a normal situation.

According to an embodiment of the present disclosure, the state monitoring method further comprises: activating an alarm to administrators of the application platform server and the third party application server if the online application is determined to be running abnormally.

In an embodiment, an online application system comprises: a search engine module for receiving a user search request from a user browser; searching for a match according to the search request and obtaining an online application that matches with the search request to form a search result page; and an application running environmental module for presenting the online application before the user browser in a form as a canvas page which is embedded in the search result page and is directly accessible from the search result page.

According to an embodiment of the present disclosure, the application running environmental module presents the online application in response to a user request or automatically.

According to an embodiment of the present disclosure, the application running environmental module sends a canvas page code that corresponds to the online application to the user browser so as to form the canvas page.

According to an embodiment of the present disclosure, the online application system further comprises: a third party application server for providing at least one of the online application and contents related to the online application.

According to an embodiment of the present disclosure, the application running environmental module sends the online application to the user browser to form an embedded page to be embedded in the canvas page.

According to an embodiment of the present disclosure, the application running environmental module further sends the contents related to the online application to the user browser.

According to an embodiment of the present disclosure, the canvas page or the embedded page sends a data request to the third party application server, and the third party server sends the contents related to the online application to the user browser.

According to an embodiment of the present disclosure, the application running environmental module sends an application request to a third party application server, receives the online application from the third party application server, processes the online application and sends the processed online application to the user browser to form an embedded page to be embedded in the canvas page.

According to an embodiment of the present disclosure, the application running environmental module further sends a data request to the third party application server, receives the contents related to the online application from the third party application server, and transmits the contents to the user browser.

According to an embodiment of the present disclosure, the online application system further comprises: an open platform infrastructure service module for transmitting contents related to the online application to the third party application server; and receiving the contents related to online application that have been processed by the third party application server, the processed contents to the user browser being transmitted by the application running environmental module.

According to an embodiment of the present disclosure, the canvas page sends an application request to a third party application server which then sends the online application to the user browser to form an embedded page to be embedded in the canvas page.

According to an embodiment of the present disclosure, the canvas page or the embedded page sends a data request from to the third party application server which then sends contents related to the online application to the user browser.

According to an embodiment of the present disclosure, the canvas page or the embedded page sends a data request to the third party application server, and the application running environmental module receives the data request from the third party application server via the open platform infrastructure service module, and sends contents related to the online application to the third party application server which then forwards the contents onto the user browser.

According to an embodiment of the present disclosure, the online application system further comprises a state monitoring device which further comprises: a log statistic module for calculating how many times the user browser respectively loads a canvas page from the application platform server, and loads an embedded page from the third party application server; and a log analysis module for determining a running state of the online application that produces the embedded page based on the times of loading the canvas page and the times of loading the embedded page.

According to an embodiment of the present disclosure, the log statistic module receives a first request from the canvas page through the user browser; and determines the times of loading the canvas page as the times of receiving the first request.

According to an embodiment of the present disclosure, the log statistic module receives a second request from the embedded page through the user browser; and determines the times of loading the embedded page as the times of receiving the second request.

According to an embodiment of the present disclosure, the second request is generated by an embedded program that is embedded in the online application.

According to an embodiment of the present disclosure, if the log analysis module determines that the ratio of the times of loading the embedded page to the times of loading the canvas page is smaller than a threshold value, the online application is determined to be running abnormally.

According to an embodiment of the present disclosure, the threshold value is a statistical threshold determined according to the calculated result.

According to an embodiment of the present disclosure, the threshold value is set to 0.85*X, in which X denotes an average ratio of the times of loading the embedded page to the times of loading the canvas page which are calculated under a normal situation.

According to an embodiment of the present disclosure, the state monitoring device further comprises: an alarm module for activating an alarm to administrators of the application platform server and the third party application server if the online application is determined to be running abnormally.

Using the technical solutions presented supra, a user may directly search out an online application via a search engine without a need to click multi-level linkages. The technical solutions as presented herein facilitate making the whole search process quick and convenient, enhancing the users' experiences with the networks.

DETAILED DESCRIPTION

The present disclosure will be understood more fully from the following embodiments with reference to the drawings.

Figure 1:
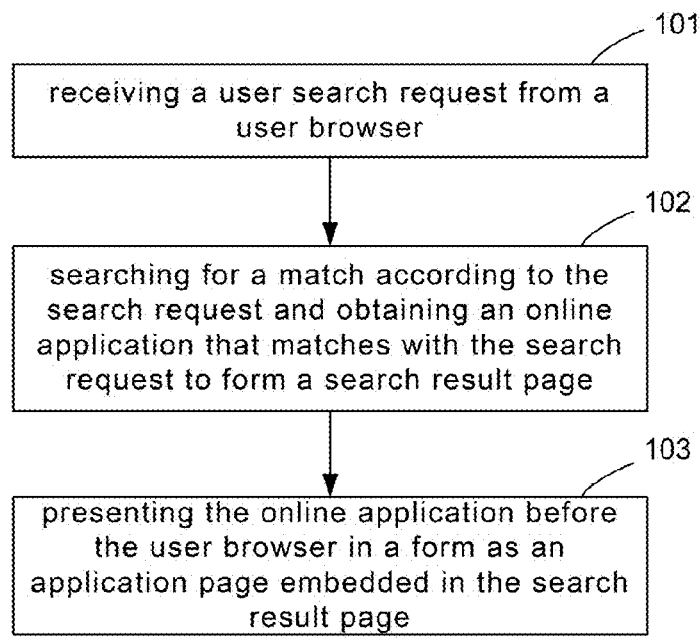
FIG. 1 is a flow chart illustrating a method for implementing an online application system according to the present disclosure.

Reference is first made to FIG. 1 which is a flow chart illustrating a method for implementing an online application system according to the present disclosure. The method as shown in FIG. 1 comprises: Step 101: receiving a user search request from a user browser; Step 102: searching for a match according to the search request and obtaining an online application that matches with the search request to form a search result page; Step 103: presenting the online application before the user browser in a form as an application page embedded in the search result page. According to this embodiment, after forming the search result page, the online application may be presented in response to a user request or presented automatically.

A first embodiment of the present disclosure is set forth in detail below with reference to FIGS. 2 and 3.

Figure 2:
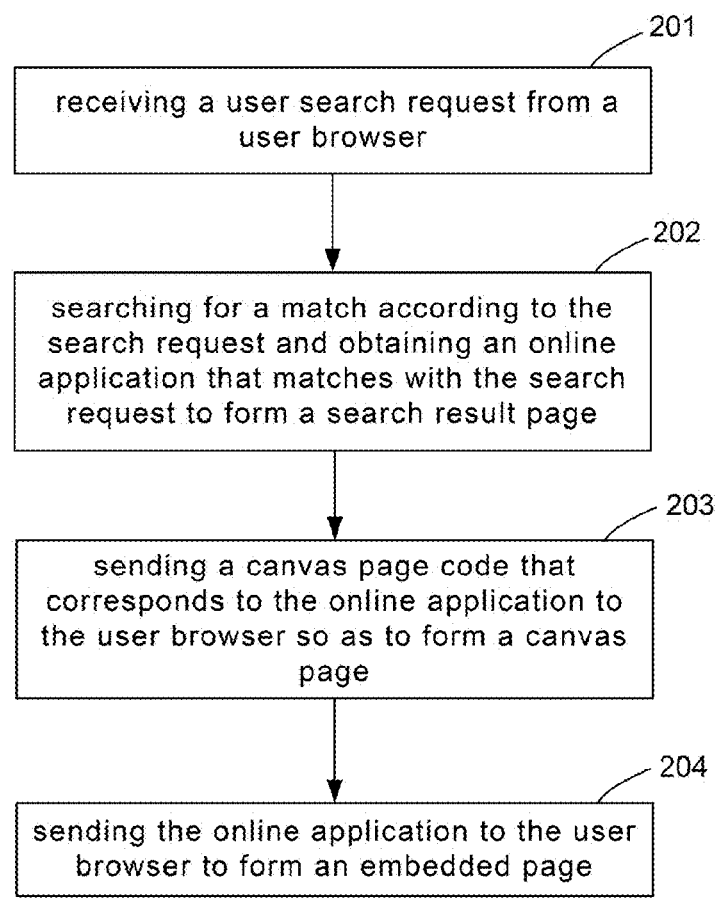
FIG. 2 is a flow chart illustrating a method for implementing an online application system according to a first embodiment of the present disclosure.

FIG. 2 is a flow chart illustrating a method for implementing an online application system according to a first embodiment of the present disclosure.

As is shown in FIG. 2, a user search request is received from a user browser at Step 201. For example, the user may open a search engine website via a user browser, enters a search request in a search bar and clicks the "Search" button. The user browser then forwards the user search request to an application platform server.

At Step 202, the application platform server carries out a search according to the search request and obtains an online application that matches with the search request to form a search result page.

At Step 203, the application platform server sends to the user browser a canvas page code that corresponds to the online application so as to form a canvas page. In this embodiment, the canvas page code is sent to the user browser which displays the search result page such that the canvas page is embedded in the search result page.

The application platform server sends the online application to the user browser to form an embedded page at Step 204. The embedded page is embedded in the canvas page to form an application page (with reference to FIG. 3). According to this embodiment, the online application is stored locally at the application platform server, which be submitted by an independent explorer to the application platform server for authentication. In an embodiment, the application platform server may further transmit information stored locally therein to the user browser. The user browser subsequently incorporates into the embedded page said information based on the online application. In this embodiment, said information may be transmitted simultaneously with the corresponding online application, or separately in response to a data request from the embedded page.

Figure 3:
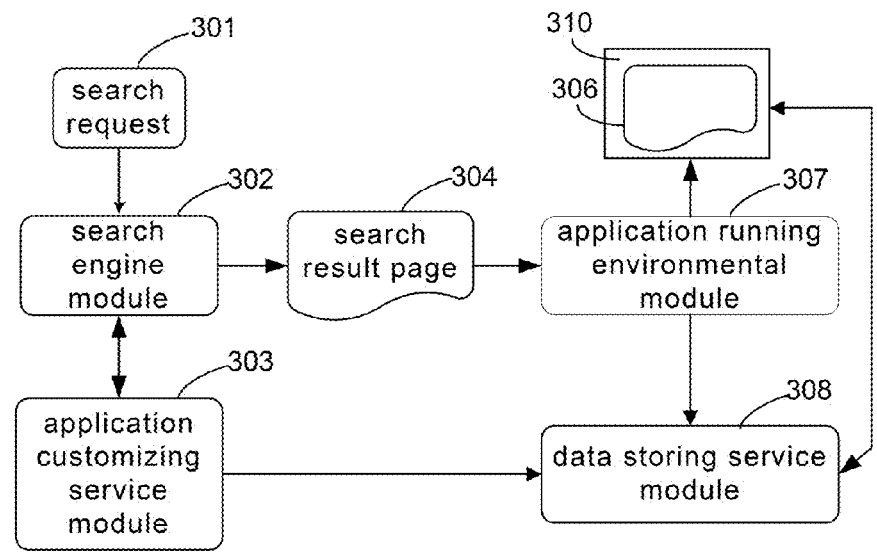
FIG. 3 is a schematic diagram illustrating an online application system according to a first embodiment of the present disclosure.

Reference is now made to FIG. 3, which is a schematic diagram illustrating an online application system according to the first embodiment of the present disclosure It can be seen from FIG. 3 that the online application system comprises an application platform server, which includes a search engine module 302, an application running environmental module 307, an application customizing service module 303 and a data storing service module 308.

The user transmits a search request 301 to the search engine module 302 via the user browser. Upon search for a match, the search engine module 302 obtains an online application that matches with the search request 301, and forms a search result page 304. In response to the user request (for example, a click to the search result page 304 over the user browser) or an automatic trigger of the system, the application running environmental module 307 transmits the canvas page code corresponding to the online application to the user browser to form a canvas page 310. The canvas page 310 then sends an application request to the data storing service module 308 which then transmits the online application to the user browser to form an embedded page 306 to be embedded in the canvas page 310. The embedded page 306 together with the canvas page 310 forms an application page. The embedded page 306 embedded in the canvas page 310 is displayed on the user browser to be presented before the user. The use is allowed to use the online application directly over the user browser. When the online application is being operated (or before it is operated), the canvas page 310 or the embedded page 306 may obtain information related to the online application from the data storing service module 308.

According to this embodiment, the online application is invoked from the data storing service module 308. The online application stored in the data storing service module 308 may be a flash type of data of the online application itself, or a label page type of data, e.g., HTML-like data. If the data storing service module 308 stores HTML-like data, the data storing service module 308 will filter the HTML data with respect to security and convert the HTML-like data to standard HTML data before transmitting the online application to the user browser. When the online application is being operated, necessary information is fetched from the data storing service module 308. Besides, the contents generated during the operation of the online application may be directly inputted to, stored and processed by the data storing service module 308.

Besides, the search engine module 302 is capable of designing the search result page 304 according to the services customized by a user before the searching such that the search results may be organized according to the user's preferences. These customized services are provided by the application customizing service module 303. For example, using the application customizing service module 303, the user is allowed to set his or her preferences, and add to favorites, etc. Consequently, the search result page 304 will display the user's preferences or favorites at the top to facilitate the user's acquisition.

In this embodiment, the online application may be, for example, an online game that needs to maintain users' credits or game progresses.

Figure 13A:
FIG. 13a illustrates an example of a search result webpage according to a first embodiment of the present disclosure.
Figure 13B:
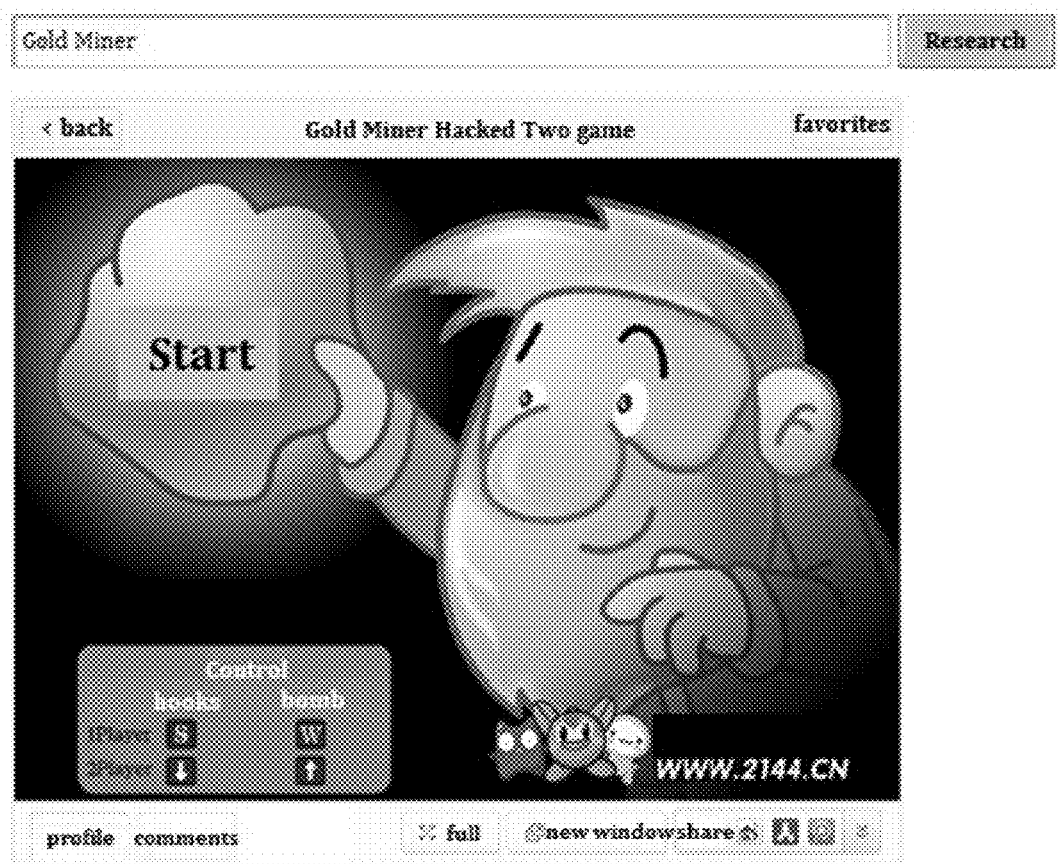
FIG. 13b illustrates an example of a search result webpage with an embedded online game application according to a first embodiment of the present disclosure.

Hereunder is how the aforesaid online game application is obtained. When a user wishes to obtain an online game using the aforesaid online application system, the user may input the name of the game or other relevant information to a search bar presented on a search engine, and clicks "Search" button. For example, the user may input "黄金矿工" in Chinese (Gold Miner). The user browser forwards the search request to the search engine module 302 of the online application system, which then searches an index database for a match based on the search request, and obtains the search results, e.g., a plurality of online games that match with the search request. The search engine module 302 sends the code of the search result page 304 to the user browser which then forms the search result page 304, as shown in FIG. 13a. When the user clicks the desired online game, for example, "黄金矿工双人版" ("two-player Golden Miner"), the user browser sends the corresponding user request to the application running environmental module 307. The application running environmental module 307 then transmits the canvas page code corresponding to the selected online game to the user browser to form a canvas page 310. Thereafter, the canvas page 310 sends an application request to the data storing service module 308, which in turn transmits an interface code and a game code of the online game at the corresponding address to the user browser, forming an embedded page 306 to be embedded in the canvas page 310, as shown in FIG. 13b. So far, the user can gain access to the desired online game via the user browser. Stated another way, the user is allowed to directly use the online game from the search result, e.g., the online game is available upon search without the need to click the URL of the search result to enter the game webpage and the other links to finally gain access to the online game. When the online game is being operated (or before it is operated), the canvas page 310 or the embedded page 306 acquires the users' credits or game progresses related to the online application from the data storing service module 308, and updates the users' credits or game progresses in the data storing service module 308 when the game is over.

A second embodiment according to the present disclosure is set forth in detail below with reference to FIG. 4.

Figure 4:
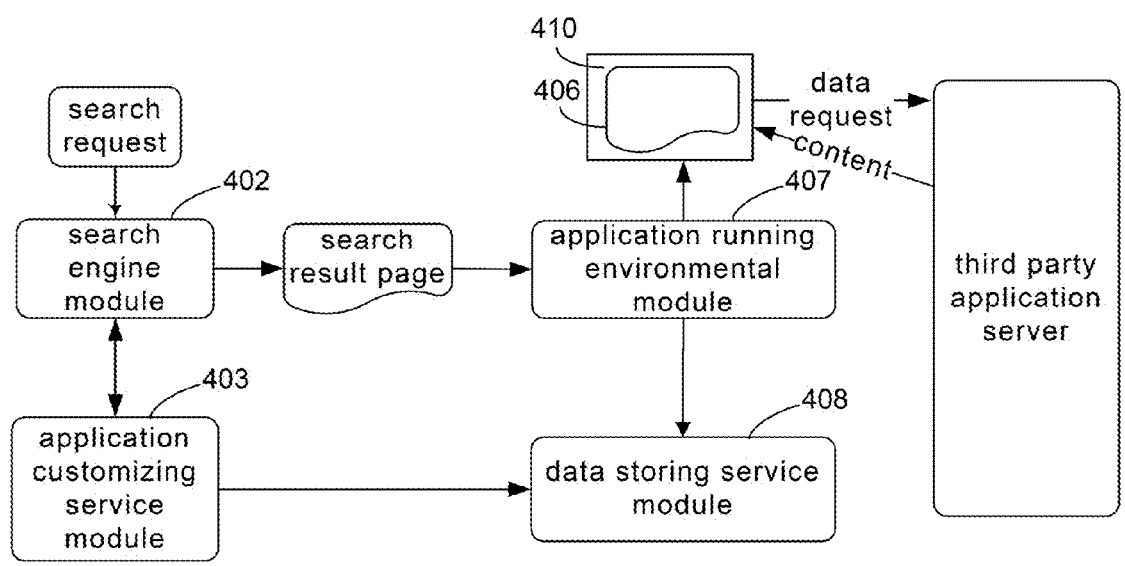
FIG. 4 is a schematic diagram illustrating an online application system according to a second embodiment of the present disclosure.

It can be seen from FIG. 4 that the online application system comprises an application platform server and a third party application server. The application platform server includes a search engine module 402, an application running environmental module 407, an application customizing service module 403 and a data storing service module 408.

The second embodiment differs from the first embodiment as shown in FIGS. 2 and 3 in that after the steps (including the application running environmental module 407 directly transmitting the canvas page code to the user browser; the canvas page 410 sending an application request to the data storing service module 408; and the data storing service module 408 in turn transmitting the online application to the user browser to finally form an embedded page 406 to be embedded in the canvas page 410), the embedded page 406 or the canvas page 410 that constitutes the application page sends a data request to the third party application server, which then sends contents related to the online application to the user browser.

In this embodiment, the online application may be, for example, an online reader stored in the application platform server, while the relevant contents may be online electronic books stored in the third party application server.

Figure 14:
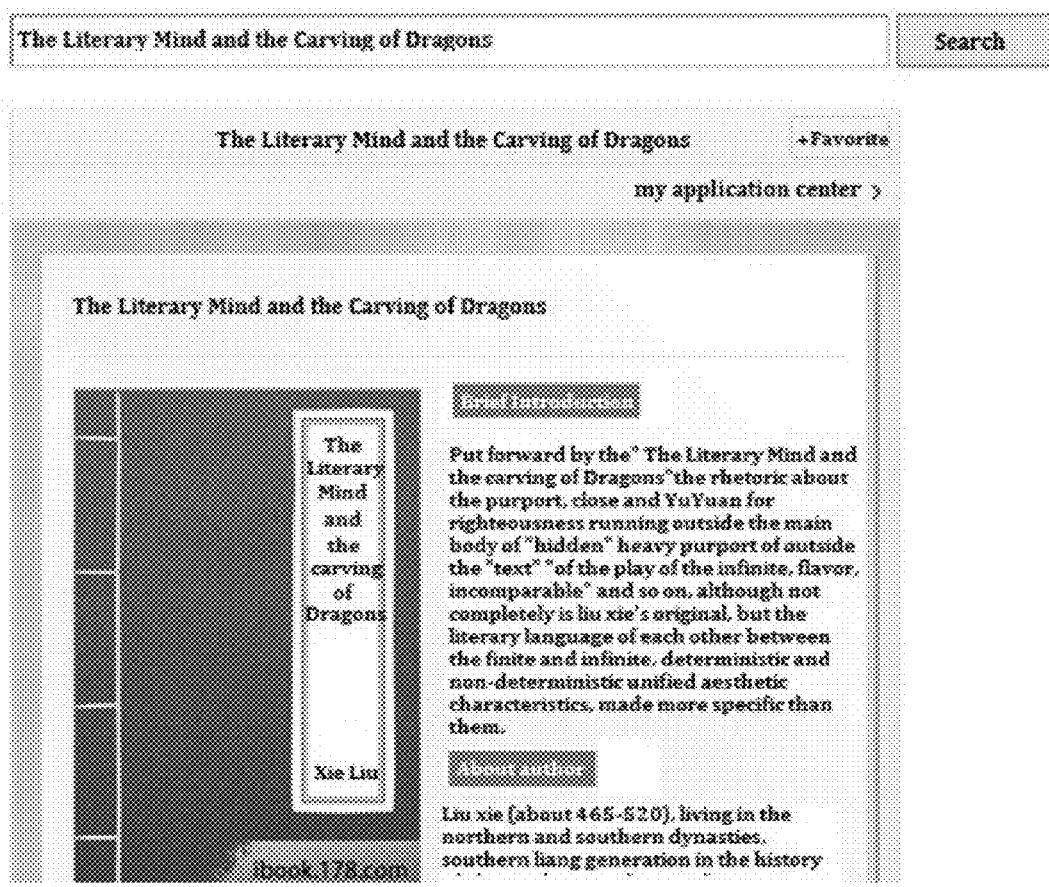
FIG. 14 illustrates another example of a search result webpage with an embedded online electronic book application according to a second embodiment of the present disclosure.

Described hereunder is how the aforesaid online application is obtained. When a user wishes to access an online electronic book using the aforesaid online application system, the user may input the name of a book or other relevant information to a search bar presented on a search engine, and clicks "Search" button. For example, the user may input "文心 雕龙" in Chinese. The user browser forwards the search request to the search engine module 402 of the online application system, which then searches an index database for a match based on the search request, and obtains the search results, e.g., a plurality of online electronic books that match with the search request. The search engine module 402 sends the code of the search result page to the user browser which then operates and forms the search result page. When the user clicks the desired online electronic book, the user browser sends the corresponding user request to the application running environmental module 407. The application running environmental module 407 then transmits the canvas page code corresponding to the selected online electronic book to the user browser to form a canvas page 410. Thereafter, the canvas page 410 sends an application request to the application running environmental module 407, which then interacts with the data storing service module 408 to obtain an interface code and a reader code of the online reader. These codes are directly sent to the user browser to form an embedded page 406 to be embedded in the canvas page 410. Thereafter, the embedded page 406 or the canvas page 410 sends a data request to the third party application server to obtain the corresponding online electronic book, which is presented before the user after being parsed by the online reader, as shown in FIG. 14. Consequently, the user is able to read the online electronic book directly from the search result. Stated another way, the online electronic book is available upon search without the need to click the URL of the search result and the other links to gain access to the online electronic book page.

A third embodiment according to the present disclosure is set forth in detail below with reference to FIGS. 5 and 6.

Figure 5:
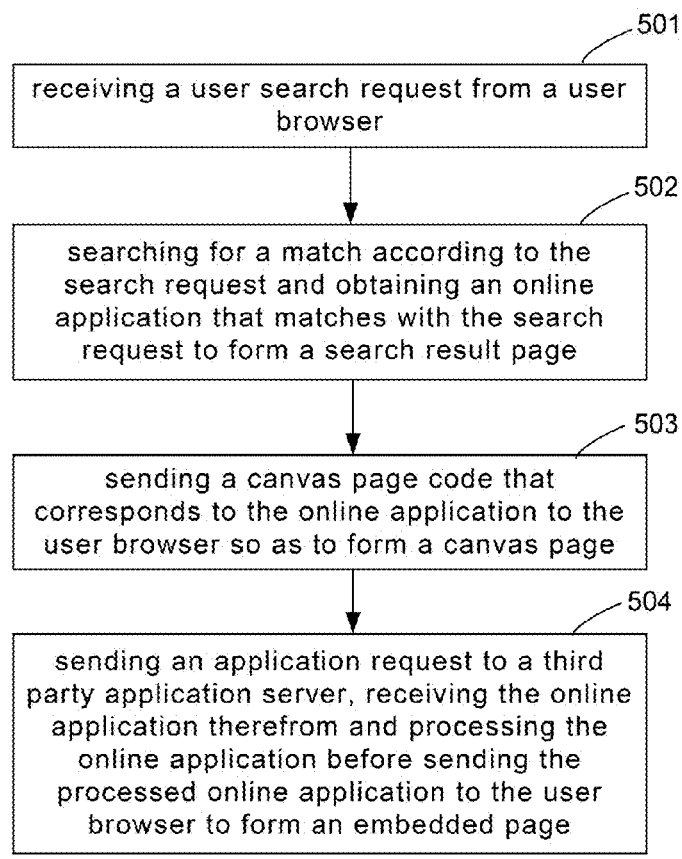
FIG. 5 is a flow chart illustrating a method for implementing an online application system according to a third embodiment of the present disclosure.

FIG. 5 is a flow chart illustrating a method for implementing an online application system according to a third embodiment of the present disclosure.

As is shown in FIG. 5, the application platform server receives a user search request from a user browser at Step 501.

At Step 502, the application platform server carries out a search based on the search request and obtains the online application that matches with the search request to form a search result page.

At Step 503, the application platform server sends to the user browser a canvas page code that corresponds to the online application to form a canvas page.

At Step 504, the application platform server sends an application request to a third party application server, and receives the online application therefrom. Having processed the online application, the application platform server sends the processed online application to the user browser to form an embedded page. According to this embodiment, the application request may be generated in response to a user request or triggered automatically by the system. Step 504 may further comprise transmitting a data request to the third party application server, receiving contents related to the online application from the third party application server, and transmitting the received contents to the user browser.

Figure 6:
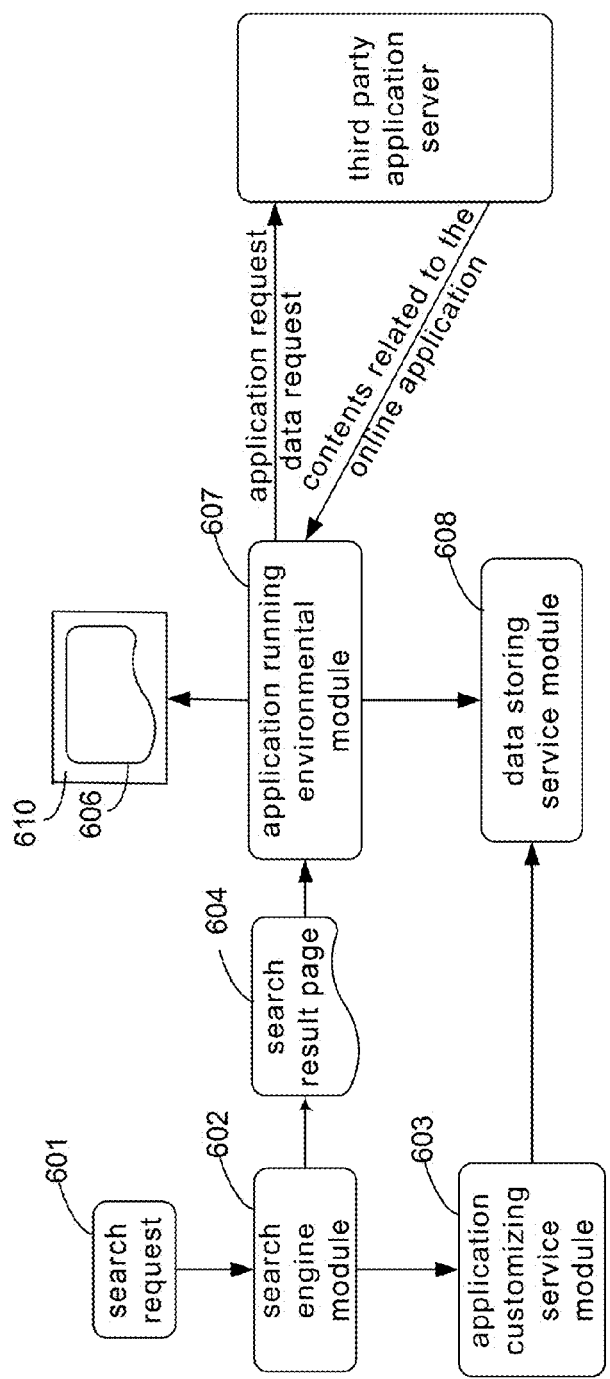
FIG. 6 is a schematic diagram illustrating an online application system according to a third embodiment of the present disclosure.

Reference is now made to FIG. 6, which is a schematic diagram illustrating an online application system according to a third embodiment of the present disclosure.

It can be seen from FIG. 6 that the online application system according to a third embodiment of the present disclosure comprises an application platform server and a third party application server. The application platform server includes a search engine module 602, an application running environmental module 607, an application customizing service module 603 and a data storing service module 608.

The user transmits a search request 601 to the search engine module 602 via the user browser. Upon search for a match, the search engine module 602 obtains an online application that matches with the search request 601, and forms a search result page 604. In response to the user request (for example, a click to the search result page 304 over the user browser) or an automatic trigger of the system, the application running environmental module 607 transmits the canvas page code corresponding to the online application to the user browser to form a canvas page 610. The application running environmental module 607 further transmits an application request to the third party application server, receives and processes the online application received from the third party application server, and transmits the processed online application to the user browser to form an embedded page 606. The embedded page 606 together with the canvas page 610 forms an application page. In addition, the application running environmental module 607 may further transmit a data request to the third party application server, receive contents related to the online application from the third party application server, and transmit the contents to the user browser.

According to this embodiment, both the online application and the associated contents are invoked from the third party application server.

It is worth mentioning that in this embodiment, the application running environmental module 607 may parse the online application transmitted from the third application server as codes executable by the user browser. Therefore, this embodiment is applicable to online application exploration according to self-defined standards.

A Fourth embodiment according to the present disclosure is set forth in detail below with reference to FIG. 7.

Figure 7:
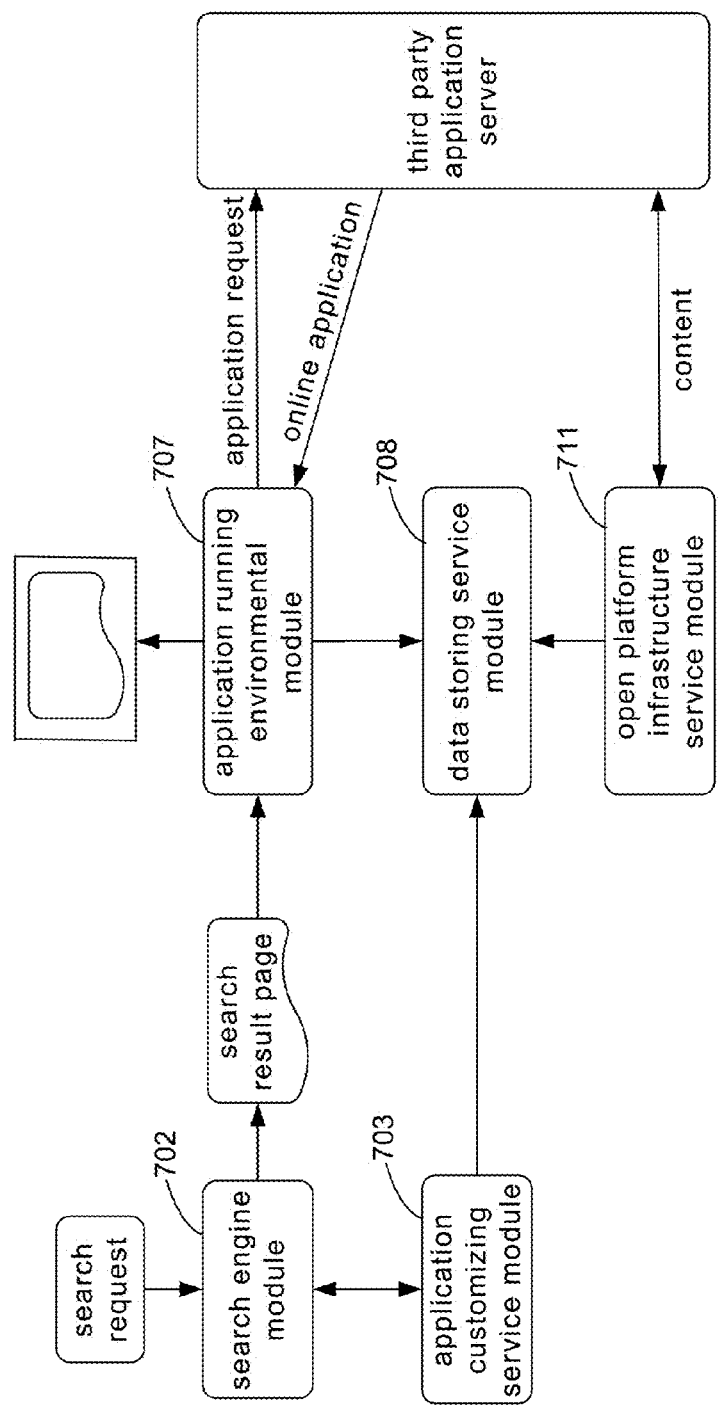
FIG. 7 is a schematic diagram illustrating an online application system according to a fourth embodiment of the present disclosure.

FIG. 7 is a schematic diagram illustrating an online application system according to a fourth embodiment of the present disclosure;

It can be seen from FIG. 7 that the online application system according to a fourth embodiment of the present disclosure comprises an application platform server and a third party application server. The application platform server includes a search engine module 702, an application running environmental module 707, an application customizing service module 703, a data storing service module 708 and an open platform infrastructure service module 711.

The fourth embodiment differs from the third embodiment as shown in FIGS. 5 and 6 in that the application running environmental module 707 transmits the contents related to the online application to the third party application server, receives the processed contents therefrom, and transmits the processed contents to the user browser. In this embodiment, the third party application server and the application platform service interact with each other using the open platform infrastructure service module 711.

In this embodiment, the online application may be invoked from the third party application server. The related contents are stored in the application platform service, and processed by the third part application service before being returned to the application platform server and invoked therefrom.

A fifth embodiment according to the present disclosure is set forth in detail below with reference to FIGS. 8 and 9.

Figure 8:
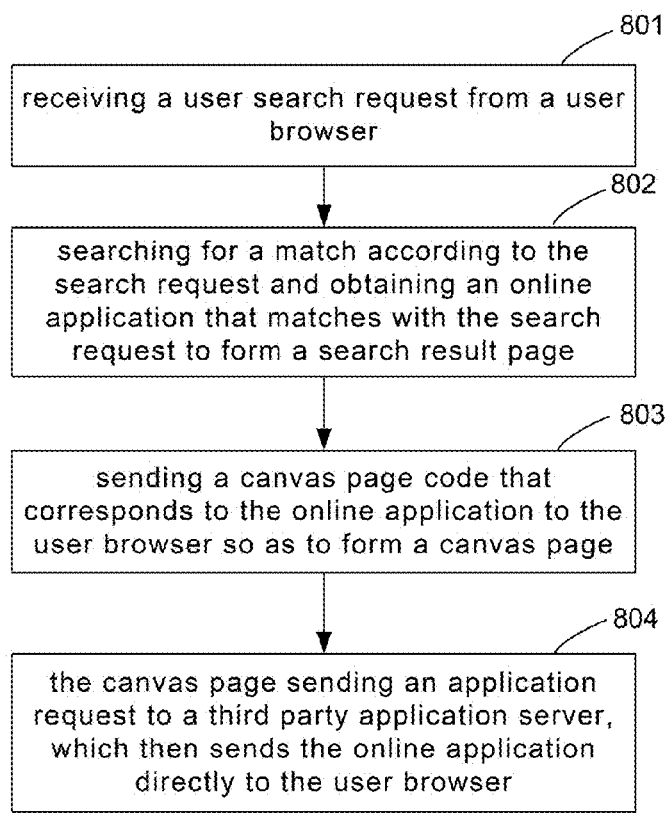
FIG. 8 is a flow chart illustrating a method for implementing an online application system according to a fifth embodiment of the present disclosure.

FIG. 8 is a flow chart illustrating a method for implementing an online application system according to a fifth embodiment of the present disclosure.

As is shown in FIG. 8, the application platform server receives a user search request from a user browser at Step 801.

At Step 802, the application platform server searches for a match according to the search request and obtains an online application that matches with the search request to form a search result page.

At Step 803, the application platform server sends to the user browser a canvas page code that corresponds to the online application to form a canvas page.

At Step 804, the application platform server sends an application request to a third party application server, which then sends the online application directly to the user browser to form an embedded page.

Figure 9:
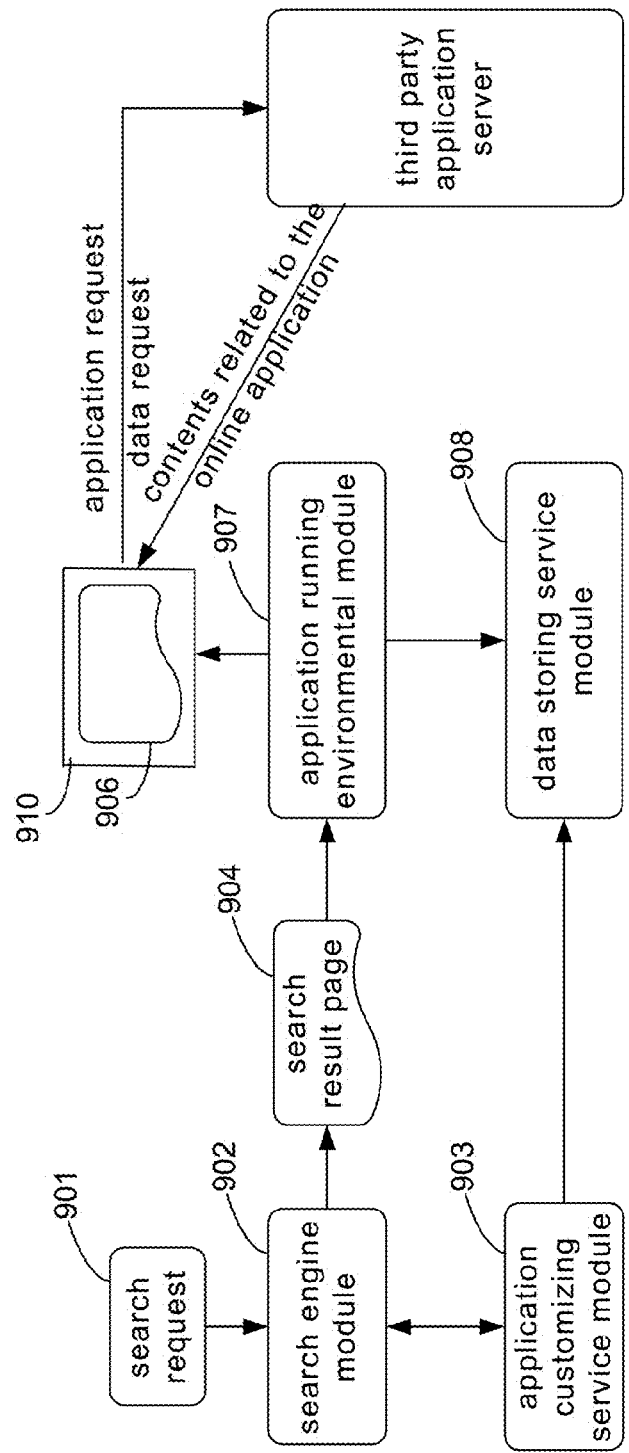
FIG. 9 is a schematic diagram illustrating an online application system according to a fifth embodiment of the present disclosure.

Reference is now made to FIG. 9, which is a schematic diagram illustrating an online application system according to the fifth embodiment of the present disclosure.

It can be seen from FIG. 9 that the online application system according to a fifth embodiment of the present disclosure comprises an application platform server and a third party application server. The application platform server includes a search engine module 902, an application running environmental module 907, an application customizing service module 903 and a data storing service module 908.

The user transmits a search request 901 to the search engine module 902 via the user browser. Upon search for a match, the search engine module 902 obtains an online application that matches with the search request 901, and forms a search result page 904. In response to the user request (for example, a click to the search result page 304 over the user browser) or an automatic trigger of the system, the application running environmental module 907 transmits a canvas page code corresponding to the online application to the user browser to form a canvas page 910. According to this embodiment, the canvas page 910 is configured to transmit an application request to the third party application server, and the third party application server then directly transmits the online application to the user browser to form an embedded page 906. The embedded page 906 is displayed on the user browser and presented to the user in a manner to be embedded in the canvas page 910. Apparently, the user is allowed to directly use the online application over the user browser. In addition, the canvas page 910 or the embedded page 906 may be further configured to transmit a data request to the third party application server, which then transmits contents associated with the online application to the user browser.

It is worth mentioning that in this embodiment, the user browser may directly run the online application transmitted from the third party application server. Therefore, this embodiment is suited for online application exploration according to a general standard (for example, Iframe).

In the present embodiment, the online application is invoked from the third party application server by the canvas page 910, while the relevant contents are invoked from the third party application server by the canvas page 910 or the embedded page 906. This embodiment may be implemented to obtain an online virus scan application.

Figure 15:
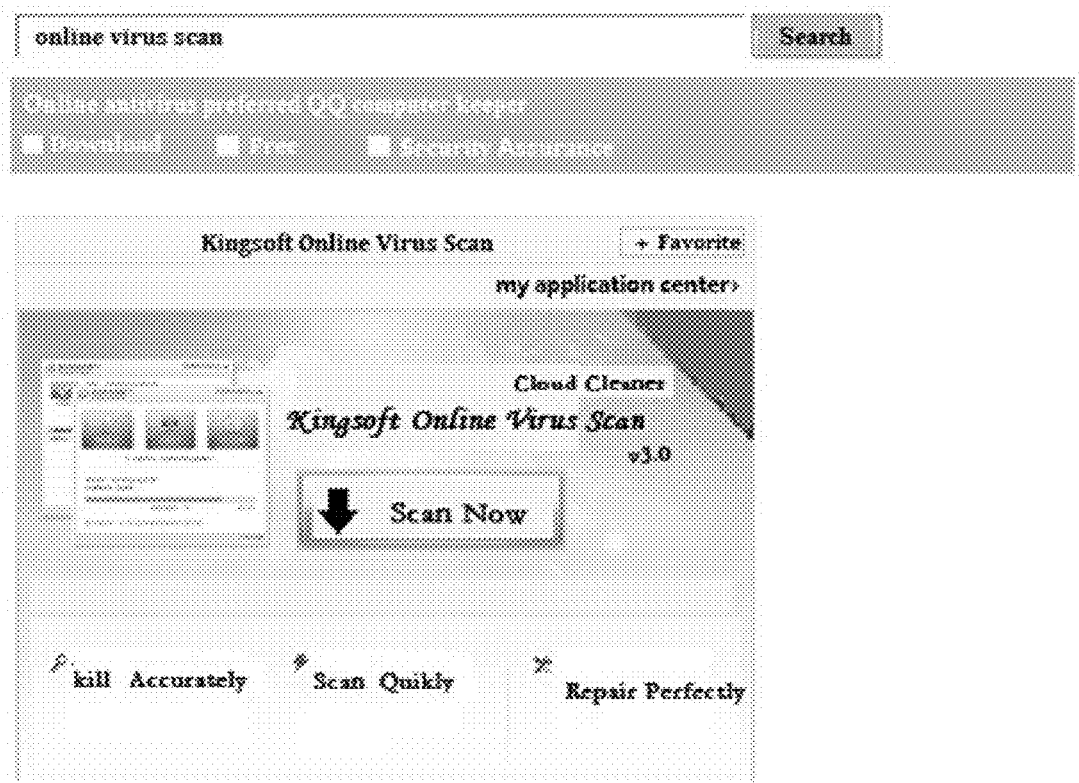
FIG. 15 illustrates another example of a search result webpage with an embedded online virus scan application according to a fifth embodiment of the present disclosure.

Described hereunder is how the aforesaid online virus scan application is acquired. When a user wishes to scan virus online using the aforesaid online application system, the user may input " 在线杀毒 " in Chinese ("online virus scan") or other relevant information to a search bar presented on a search engine, and clicks "Search" button. The user browser forwards the search request to the search engine module 902 of the online application system, which then searches an index database for a match based on the search request, and obtains search results, e.g., a plurality of online virus scan applications that match with the search request. The search engine module 902 sends the code of the search result page to the user browser which then operates and forms the search result page 904. When the user clicks the desired online virus scan application, the user browser will send the corresponding user request to the application running environmental module 907. The application running environmental module 907 then transmits the canvas page code corresponding to the online virus scan application to the user browser to form a canvas page 910. Thereafter, the canvas page 910 sends an application request to the third party application server, which then sends an interface code and a virus scan program code of the online virus scan application to the user browser, thereby forming an embedded page 906 to be embedded in the canvas page 910. Subsequently, the embedded page 906 or the canvas page 910 sends a data request to the third party application server to obtain the corresponding virus database for use in the subsequent virus scan process with the online virus scan application. As is shown in FIG. 15, the user inputs " 在线杀毒 " in Chinese ("online virus scan"), and is given the search result, e.g., an application page with the online applications embedded therein using the aforesaid process. Apparently, the user is able to use the online application directly from the search result. Stated another way, the online application is available upon search, e.g., the user does not have to click the URL of the search result or any other links in order to access the online virus scan page to eventually finish the virus scan.

A sixth embodiment according to the present disclosure is set forth in detail below with reference to FIG. 10.

Figure 10:
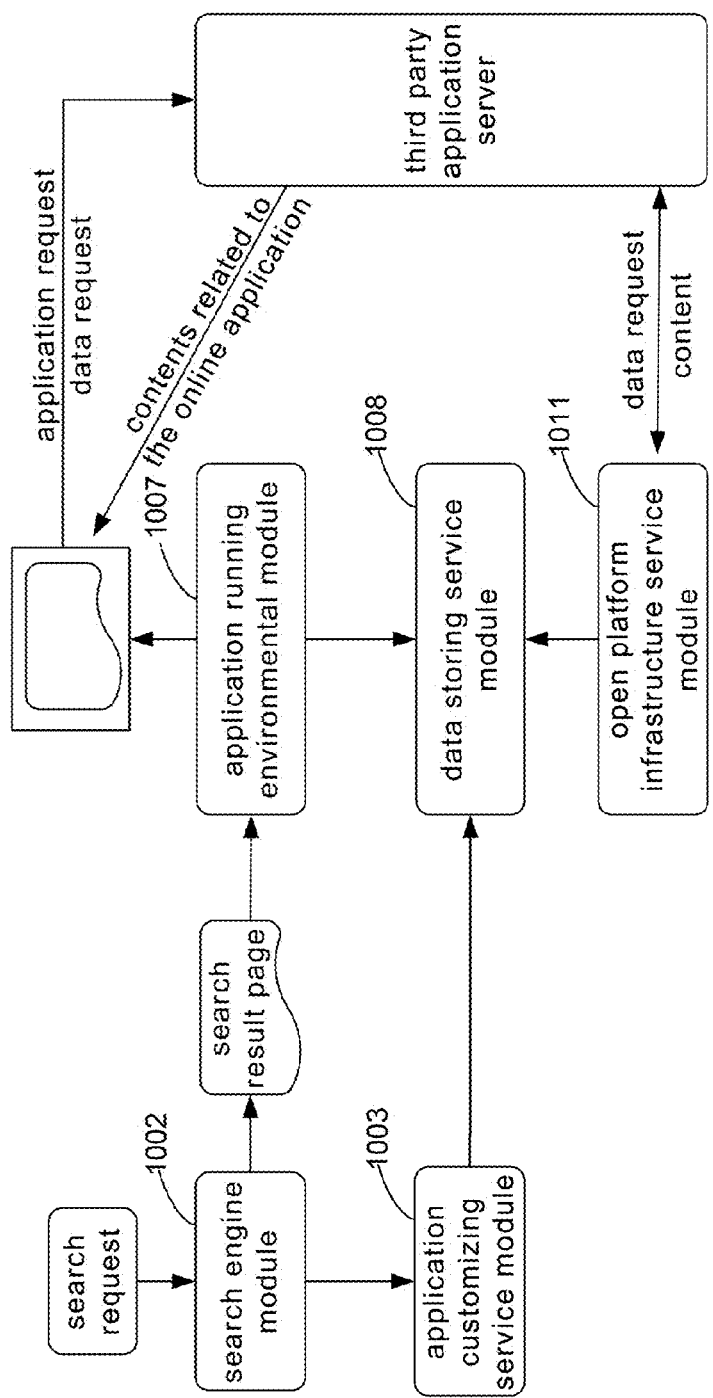
FIG. 10 is a schematic diagram illustrating an online application system according to a sixth embodiment of the present disclosure.

It can be seen from FIG. 10 that the online application system according to a sixth embodiment of the present disclosure comprises an application platform server and a third party application server. The application platform server includes a search engine module 1002, an application running environmental module 1007, an application customizing service module 1003, a data storing service module 1008 and an open platform infrastructure service module 1011.

The sixth embodiment differs from the fifth embodiment as shown in FIGS. 8 and 9 in that the third party application server transmits a data request to the application platform server upon receipt of the data request from the application page, and that the application platform server sends contents related to the online application to the third party application server, which then forwards said contents to the user browser. In an embodiment, the third party application server may process the received contents before sending the contents to the user browser. In this embodiment, the application platform server and the third party application server interact with each other via the open platform infrastructure service module 1011.

According to this embodiment, the online application is invoked from the third party application server, while the contents are invoked from the application platform server by the third part application service.

Figure 11:
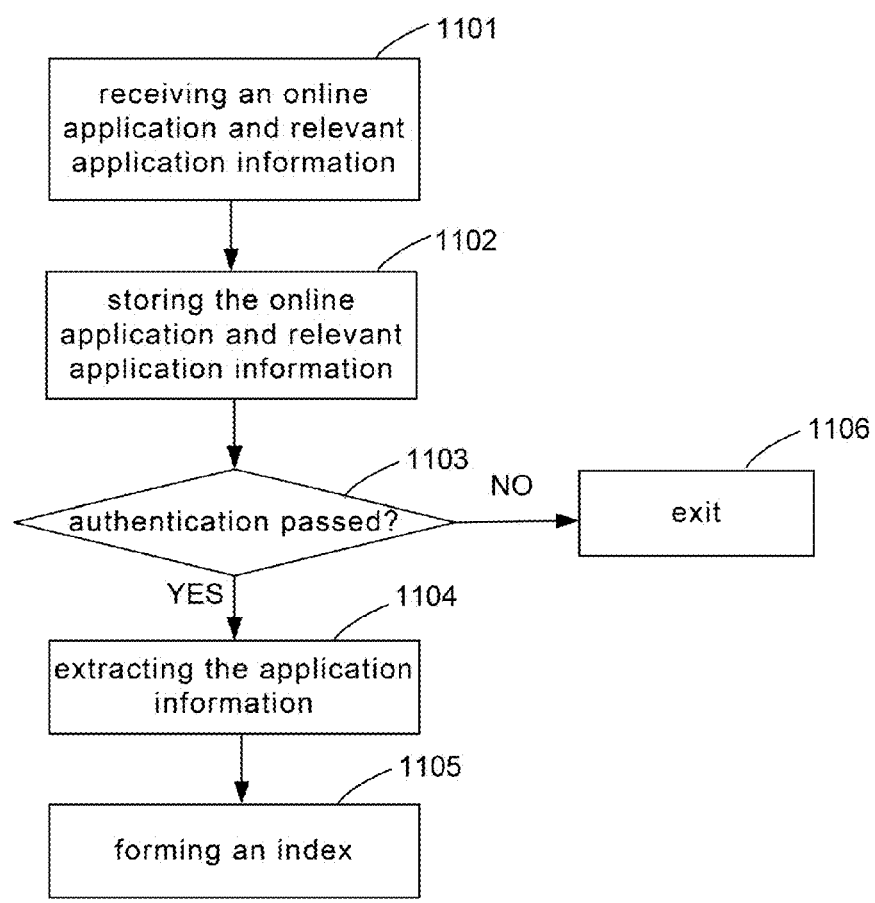
FIG. 11 is a flow chart illustrating a method for authenticating an online application system according to the present disclosure.

Reference is now made to FIG. 11, which shows a flow chart illustrating a method for authenticating an online application system according to the present disclosure.

As is shown in FIG. 11, an online application and relevant application information are received at Step 1101.

The received online application and relevant application information are stored at Step 1102.

The online application and relevant application information are subjected to authentication at Step 1103. If they are authenticated, the process proceeds to Step 1104; otherwise, it skips to Step 1106.

The application information is extracted at Step 1104. In an embodiment, incremental application information among the application information is extracted. The incremental application information disclosed herein refers to application information that has been changed or newly added.

At Step 1105, an index is formed based on the extracted application information for use in the subsequent search process.

The authentication method terminates at Step 1106.

Figure 12:
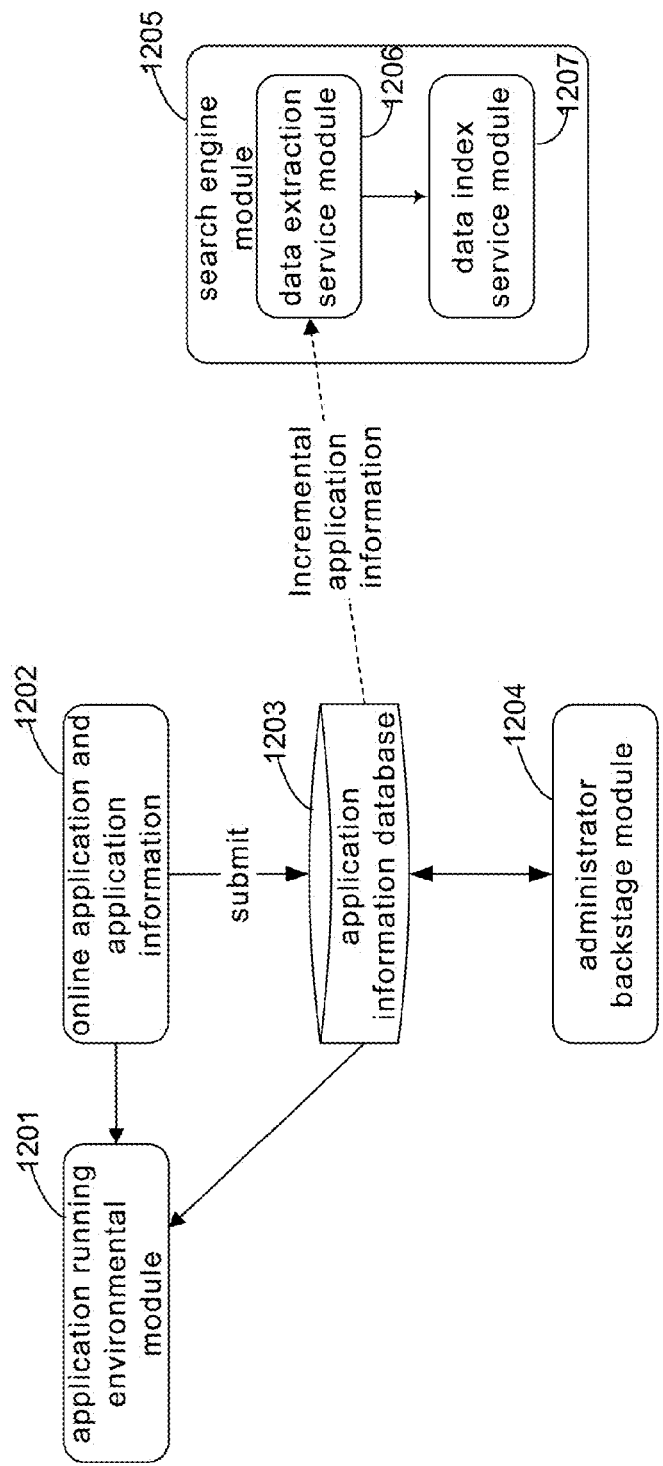
FIG. 12 is a schematic diagram illustrating an online application system according to the present disclosure.

Turning now to FIG. 12, FIG. 12 shows a schematic diagram illustrating an online application system according to the present disclosure.

As is shown in FIG. 12, the online application system comprises an application running environmental module 1201, an application information database 1203, an administrator backstage module 1204 and a search engine module 1205. The search engine module 1205 further comprises a data extraction service module 1206 and a data index service module 1207.

The application running environmental module 1201 is configured for running an online application to help a developer test the online application and the application information. The application information database 1203 is configured for storing the online application and the application information 1202 submitted by the developer.

The administrator backstage module 1204 is configured for verifying the online application and the application information 1202; the data extraction service module 1206 is configured for extracting application information from the application information database 1203. In an embodiment, the data extraction service module 1206 extracts incremental application information from the application information database 1203. The data index service module 1207 is configured for forming an index according to the extracted application information.

So far, it can be seen from the foregoing descriptions that at least some embodiments are built on the open running mechanism of the online application. For example, the search engine may conduct a search for a match based on the user search request, and obtain online applications that match with the user search request. The matching online applications are presented directly on the search result page. That is, the online applications are directly available upon search, such that the user may search out the online applications directly using the search engine without having to click multi-level links. Consequently, at least one embodiment enables a fast and convenient search process, enhancing the user's experiences with the network search.

Based on the aforesaid third embodiment through the sixth embodiment, the present disclosure further describes a method for monitoring an online application state.

Figure 16:
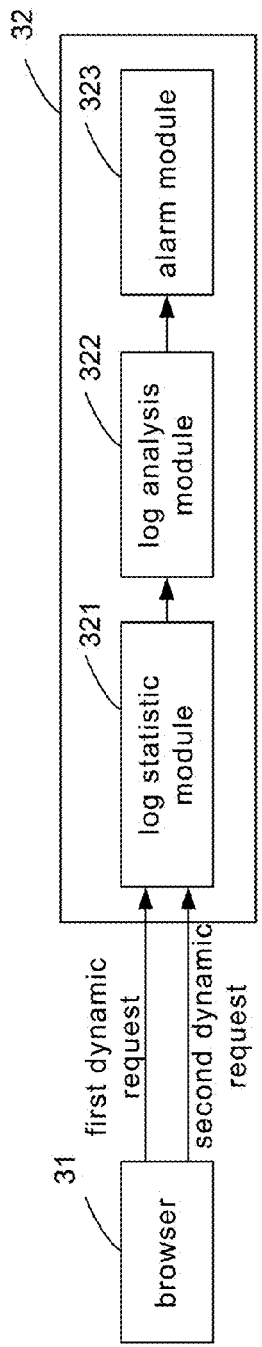
FIG. 16 is a block diagram illustrating a device for monitoring online application state according to the present disclosure.

FIG. 16 is a block diagram illustrating a device for monitoring online application state according to the present disclosure. In the present disclosure, the state monitoring device 32 may be established in an application platform server or at positions other than the application platform server. The state monitoring device 32 according to the present disclosure comprises a log statistic module 321, a log analysis module 322 and an alarm module 323. Hereunder various modules within the state monitoring device 32 are introduced in detail with respect to respective functions by referring to FIGS. 17 and 18.

Figure 17:
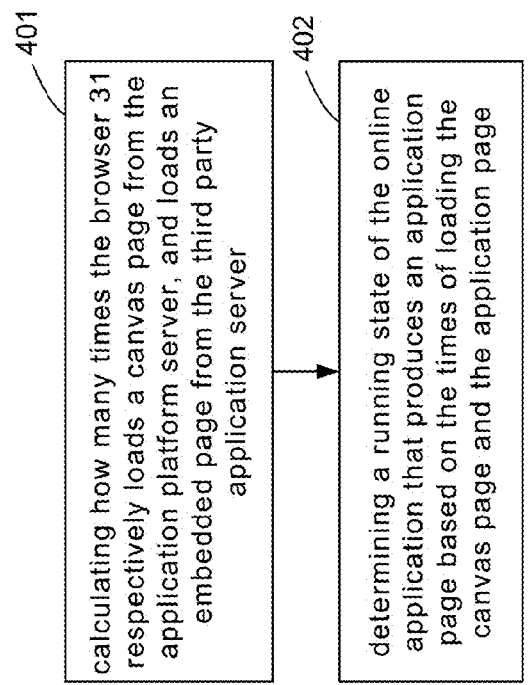
FIG. 17 is a flow chart illustrating a method for monitoring online application state according to the present disclosure.

Reference now is made to FIG. 17, which is a flow diagram illustrating a method for monitoring online application state according to the present disclosure.

As is shown in FIG. 17, at Step 401, the log statistic module 321 calculates how many times the browser 31 respectively loads a canvas page from the application platform server, and loads an embedded page from the third party application server.

Subsequently at Step 402, the log analysis module 322 determines the running state of the online application that produces the embedded pages based on the times of loading the canvas page and the embedded page.

Figure 18:
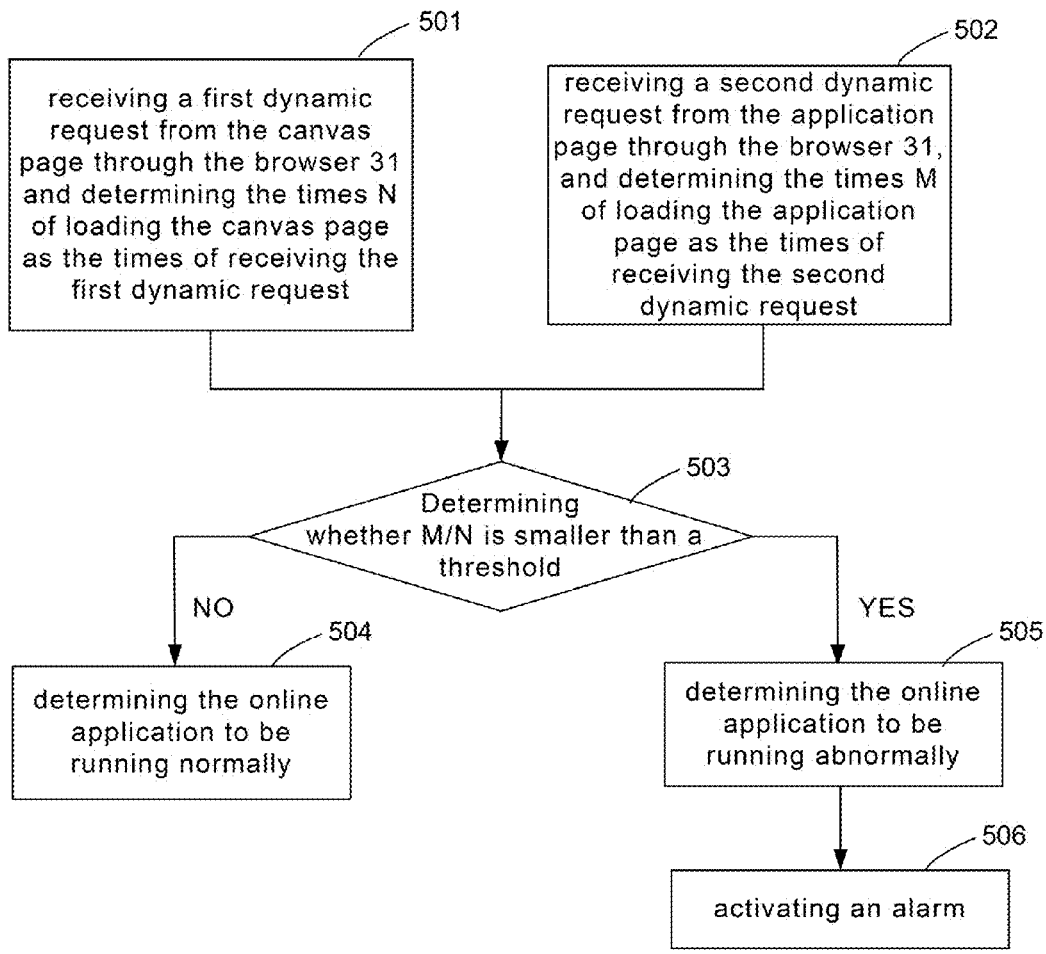
FIG. 18 is a flow diagram illustrating a particular embodiment of the method for monitoring online application state shown in FIG. 17.

Reference now is made to FIG. 18, which is a flow diagram according to a particular embodiment of the method for monitoring online application state shown in FIG. 17.

As is shown in FIG. 18, at Step 501 the log statistic module 321 receives a first dynamic request from the canvas page through the browser 31, and determines the times N of loading the canvas page as the times of receiving the first dynamic request. According to this embodiment, the first dynamic request is generated by an embedded program that is embedded in the canvas page codes. Every time when the browser 31 loads a canvas page, the embedded program is activated to generate a first dynamic request. Of course, as the application platform server and the state monitoring device 32 may be integrated with each other, persons skilled in the art may well use other alternative manners to determine the times of loading the canvas page, for example, by directly calculating how many times the canvas page code is sent.

At Step 502, the log statistic module 321 receives a second dynamic request from the embedded page through the browser 31, and determines the times M of loading the embedded page as the times of receiving the second dynamic request. According to this embodiment, the second dynamic request is generated by an embedded program that is embedded in the online application. Every time when the browser 31 loads the embedded page, the embedded program is activated to generate the second dynamic request.

It bears mentioning that designing the first and second dynamic requests facilitates preventing the requests from being cached or buffered at the browser 31, thereby facilitating monitoring accuracy. Besides, the times of receiving the first and second dynamic requests should be measured within the same determined length of time. However, it would be appreciated that under the circumstance where the issue of caching at the browser can be addressed, the same purpose may be also fulfilled using a static request.

The log analysis module 322 determines at Step 503 whether the ratio of the times of receiving the second dynamic request to the times of receiving the first dynamic request (M/N) is smaller than a threshold value. If it is not, the process then proceeds to Step 504, at which the online application is determined to be running normally. If it is smaller than the threshold value, the process skips to Step 505, where the online application is determined to be running abnormally.

If the online application is determined as abnormal, an alarm module 323 will activate, at Step 506, an alarm to the administrators of the application platform server and the third party application server.

It is worth noting that normally, when the browser 31 loads a canvas page from the application platform server, the browser 31 will also load an embedded page from the third party application server and embed it in the canvas page. After the embedded page is embedded in the canvas page, the browser 31 will continue loading new embedded pages from the third party application server based on the user operations, but there is no need to repeatedly load the canvas page. Consequently, under normal circumstances, the times M of loading the embedded pages must be greater than or at least equal to the times N of loading the canvas page. That is, the ratio M/N is equal to or larger than 1. Therefore, the threshold value at Step 503 may be set to a statistical threshold X that is determined according to a statistical result. In particular, X refers to an average ratio of the times of loading the embedded pages to the times of loading the canvas pages, both of which are determined under normal situations. However, under abnormal situations where, for example, the user has a Return or Stop operation when the browser 31 is being loaded, or the network connection rate is low or the like, some of the embedded pages may be missing. For these reasons, the threshold value is set to 0.85*X at Step 503 to allow a missing rate 15% of the embedded pages.

Besides, according to an embodiment, Steps 501 through 506 may be executed by one or more modules which are defined differently. Consequently, the foresaid functional modules described in conjunction with Steps 501-506 should not be construed to limit the steps of the method according to this embodiment.

In other embodiments presented in the present disclosure, the times of loading the canvas page and the embedded page may be sent to the log statistic module 321 in a log file. If possible, a log database may be established in the state monitoring device 32 to record the times of loading the canvas page and the embedded page for the sake of convenient backup or for future reference by an administrator.

The online application state monitoring method and device described in the present embodiment make it possible to accurately determine the running state of the online application, and allow the application platform server to swiftly have knowledge of the running state of the online application and make corresponding remedies quickly. Therefore, the user will have great experiences with the online applications offered by a third party.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), state machines, complex programmable logic devices (CPLDs), distributed processing systems, etc., and combinations thereof, as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

Persons skilled in the art would appreciate that the present disclosure should obviously not be restricted to the aforesaid exemplary embodiments, and that embodiments may be implemented in other particular embodiments without departing from the spirit or principles of the present disclosure. Therefore, the aforesaid embodiments should be considered illustrative only rather than limiting the scope of the present disclosure. Therefore, any equivalent substitutions or variations to the claim features should be considered as part of the present disclosure. Besides, reference numerals or signs appearing in the claims should not be considered to limit the scope of the claims either. Furthermore, the words "comprise" and "include" do not exclude the possibility of encompassing the other units or steps, and the word "a" or "an" does not necessarily mean a singular form. A plurality of units or devices appearing in the claims may also be implemented as a single unit or device via software or hardware. Terms such as "a first" and "a second" should also be construed as illustrative only rather than limiting a particular sequence or order.

The invention claimed is:

1. A method, comprising:
monitoring an online application state using a device having one or more processors and memory, the monitoring including:
a) calculating, using the device, respectively the times a browser loads an application platform canvas page from an application platform server, and the times the browser loads a third party application page from a third party application server, wherein the third party application page is embedded in the application platform canvas page; and
b) determining, using the device, a running state of the third party application that produces the third party application page based on a ratio of the times of loading the application platform canvas page and the times of loading the third party application page; and
selectively providing an indication of the determined running state of the third party application to the application platform server to enable a taking of one or more corrective actions in response to the indication.

2. The method according to claim 1, wherein the step a) comprises:
receiving a first request from the application platform canvas page through the browser; and
calculating the times of receiving the first request as the times of loading the application platform canvas page.

3. The method according to claim 2, wherein the step a) comprises:
receiving a second request from the third party application page through the browser; and
calculating the times of receiving the second request as the times of loading the third party application page.

4. The method according to claim 3, wherein the first request and the second request are a dynamic request, respectively.

5. The method according to claim 3, wherein the second request is generated by an embedded program that is embedded in the third party application.

6. The method according to claim 1, wherein if the ratio of the times of loading the third party application page to the times of loading the application platform canvas page is smaller than a threshold value at said Step b), the third party application is determined to be running abnormally.

7. The method according to claim 6, wherein the threshold value is a statistical threshold determined according to the calculated result.

8. The method according to claim 6, wherein the threshold value is 0.85*X, in which X denotes an average ratio of the times of loading the third party application page to the times of loading the application platform canvas page, both of which are calculated under a normal situation.

9. The method according to claim 1 wherein the selectively providing the indication comprises:

sending an alarm to the application platform server and the third party application server if the third party application is running abnormally.

10. An online application state monitoring device, comprising:

one or more processors; and memory having instructions stored thereon, wherein the instructions, when executed by the one or more processors, cause the one or more processors to:

determine respectively the times a browser loads an application platform canvas page from an application platform server, and the times the browser loads a third party application page from a third party application server, wherein the third party application page is embedded in the application platform canvas page;

determine a running state of the third party application that produces the third party application page based on a ratio of the times of loading the application platform canvas page and the times of loading the third party application page; and selectively provide an indication of the running state of the third party application to the third party application platform server to enable a taking of one or more corrective actions in response to the indication.

11. The device according to claim 10, wherein the device receives a first request from the application platform canvas page through the browser and the instructions, when executed, cause the one or more processors to determine the times of receiving the first request as the times of loading the application platform canvas page.

12. The device according to claim 11, wherein the device receives a second request from the third party application page through the browser and the instructions, when executed, cause the one or more processors to determine the times of receiving the second request as the times of loading the third party application page.

13. The device according to claim 12, wherein the first request and the second request are a dynamic request, respectively.

14. The device according to claim 12, wherein the second request is generated by an embedded program that is embedded in the third party application.

15. The device according to claim 10, wherein if it is determined that the ratio of the times of loading the third party application page to the times of loading the application platform canvas page is smaller than a threshold value, the third party application is determined to be running abnormally.

16. The device according to claim 15, wherein the threshold value is a statistical threshold determined according to the calculated result.

17. The device according to claim 15, wherein the threshold value is 0.85*X, in which X denotes an average ratio of the times of loading the third party application page to the times of loading the application platform canvas page, both of which are calculated under a normal situation.

18. The device according to claim 15 wherein the selectively providing an indication of the running state comprises:

sending an alarm to the application platform server and the third party application server if the third party application is running abnormally.

* * * * *